(12) United States Patent
Krieg et al.

(10) Patent No.: US 12,172,533 B2
(45) Date of Patent: Dec. 24, 2024

(54) ELECTRIC CIRCUIT FOR A HIGH-VOLTAGE NETWORK OF A VEHICLE

(71) Applicant: Robert Bosch GmbH, Stuttgart (DE)

(72) Inventors: Berengar Krieg, Gerlingen (DE); Ian Patrick Moss, Stuttgart (DE); Johannes Swoboda, Stuttgart (DE); Josef Goeppert, Kusterdingen (DE); Ngoc Ho Tran, Reutlingen (DE); Samuel Vasconcelos Araujo, Esslingen Am Necker (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 18/104,370

(22) Filed: Feb. 1, 2023

(65) Prior Publication Data
US 2023/0241985 A1 Aug. 3, 2023

(30) Foreign Application Priority Data
Feb. 1, 2022 (DE) ...................... 10 2022 201 067.1

(51) Int. Cl.
*B60L 50/60* (2019.01)
*H02J 7/00* (2006.01)

(52) U.S. Cl.
CPC ............ *B60L 50/66* (2019.02); *H02J 7/0013* (2013.01)

(58) Field of Classification Search
CPC .. B60L 50/66; B60L 50/50; B60L 3/00; B60L 58/20; B60L 58/19; B60L 53/16; B60L 58/18; H02J 7/0013; H02J 2310/48; H02J 7/0024; H02J 7/1423; Y02T 10/70; Y02T 10/7072; Y02T 90/14
See application file for complete search history.

(56) References Cited

U.S. PATENT DOCUMENTS

2019/0199108 A1* 6/2019 Hiroe .................. H01M 10/441

FOREIGN PATENT DOCUMENTS

| DE | 102015010531 A1 | 2/2017 |
| DE | 102016008052 A1 | 2/2017 |
| DE | 102021203352 A1 | 10/2022 |

\* cited by examiner

*Primary Examiner* — Lincoln D Donovan
*Assistant Examiner* — Alex W Lam
(74) *Attorney, Agent, or Firm* — Michael Best & Friedrich LLP

(57) ABSTRACT

An electric circuit for a high-voltage network of a vehicle. the high-voltage network includes at least two electrical energy stores. The electric circuit includes a first and second connection points, which are configured for electrical connection to a consumer (19) and/or a charger (21). A first switching unit is arranged between a first pole connector and the first connection point. A second switching unit is arranged between a second pole connector and the second connection point. A third switching unit is arranged between the first connection point and a third pole connector, and a fourth switching unit is arranged between the second connection point and a fourth pole connector. The first switching unit and/or the second switching unit are designed to be galvanically isolating in an electrically disconnecting state, and the third and fourth switching units are embodied as semiconductor components.

8 Claims, 2 Drawing Sheets

ELECTRIC CIRCUIT FOR A HIGH-VOLTAGE NETWORK OF A VEHICLE

BACKGROUND OF THE INVENTION

The present invention relates to an electric circuit for a high-voltage network of a vehicle. The high-voltage network may comprise electrical energy stores and power electronics, such as a traction machine and an inverter. The electric circuit allows disconnection and closing of an electrical connection between the electrical energy stores and the remaining high-voltage network.

Current high-voltage networks for electric vehicles comprise one or more energy stores, at least one traction machine, a charging port, one or more auxiliary consumers (coolant compressors, continuous-flow heaters) and one or more inverters. If the electric vehicle comprises an energy store, the latter is connected to the remaining high-voltage network via two switching units. If the electric vehicle comprises a plurality of energy stores, a more complex connection of the electrical energy stores to the high-voltage network is necessary. Until now, this electrical connection between the electrical energy stores and the remaining high-voltage network has been realized by high-voltage relays. These high-voltage relays allow galvanic isolation of the electrical energy stores from the remaining high-voltage network and were therefore used for safety reasons.

SUMMARY OF THE INVENTION

An electric circuit according to the invention for a high-voltage network of a vehicle comprises at least two connection points and four switching units, wherein the high-voltage network comprises at least two electrical energy stores. A first connection point and a second connection point are configured to form an electrical connection to an electrical consumer and/or an electrical charger.

A first switching unit is arranged between a first pole connector and the first connection point. The first pole connector is configured to make electrical contact with a first pole of an electrical energy store. A second switching unit is arranged between a second pole connector and the second connection point. The second pole connector is arranged to make electrical contact with a second pole of a second electrical energy store.

A third switching unit is arranged between the first connection point and a third pole connector. The third pole connector is configured to make electrical contact with a first pole of the second electrical energy store. A fourth switching unit is arranged between the second connection point and a fourth pole connector. The fourth pole connector is configured to make electrical contact with a second pole of the first electrical energy store.

The first switching unit and the fourth switching unit electrically connect the first energy store to the first connection point and the second connection point, and the second switching unit and the third switching unit electrically connect the second electrical energy store to the first connection point and the second connection point. The four switching units are switchable between an electrically contacting state and an electrically disconnecting state. As a result, the first energy store and the second energy store are arranged parallel to one another.

By closing all four switching units, the identically named poles of the first energy store and of the second energy store are respectively electrically connected to a connection point and the first energy store and the second energy store are connected in parallel to one another. By opening the first switching unit or the fourth switching unit, the circuit of the first electrical energy store is interrupted and thus also the parallel connection of the first electrical energy store to the second electrical energy store. By opening the third switching unit and the fourth switching unit, the circuit of the second electrical energy store is interrupted and thus the parallel connection of the second electrical energy store to the first electrical energy store.

Due to this arrangement of the switching units, either one of the first electrical energy store and of the second electrical energy store, or both electrical energy stores in parallel to one another can be electrically connected to the high-voltage network. Furthermore, the first switching unit and/or the second switching unit are designed such that the first switching unit and/or the second switching unit are also galvanically isolating in an electrically disconnecting state. The third switching unit and the fourth switching unit are embodied as semiconductor components.

Thus, the first electrical energy store and the second electrical energy store are respectively connected to the high-voltage network via a switching unit that is embodied as a semiconductor component, and via a switching unit that is designed to be galvanically isolating in the electrically disconnecting state. Due to the first switching unit and the second switching unit, galvanic isolation of the current circuit of the first electrical energy store and of the second electrical energy store can take place. As a result, the advantages of the high-voltage relay can be adopted in this electric circuit. Semiconductor components have significantly higher dynamics in their switching behavior, a higher service life, can be manufactured smaller than high-voltage relays, and can be more easily and more cost-effectively adapted to higher voltages.

Due to the embodiment of the third switching unit and the second switching unit as semiconductor components, the electrical connection of the first pole of the second energy store and the electrical connection of the second pole of the first energy store can be interrupted significantly more quickly than with a high-voltage relay. As a result, short-circuit currents can be interrupted more quickly than with a high-voltage relay.

Due to the arrangement of the four switching units described so far, the first switching unit and the second switching unit can be opened in a resting state of the vehicle in which no current flows into or out of the first energy store and/or the second energy store. Due to the galvanic isolation, all of the voltage difference between the identically named poles of the first energy store and of the second energy store at the first switching unit and the second switching unit decreases and is no longer applied to the semiconductor components of the third switching unit and of the fourth switching unit. As a result, a load on the third switching unit and the fourth switching unit in a resting state of the vehicle is reduced and the service life of the semiconductor components is thus extended.

Preferably, the third switching unit and the fourth switching unit of the electric circuit comprise one or more transistors. Compared to simple diodes, transistors use a control voltage to allow a current flow to flow, even against the blocking direction thereof. As a result, a current flow in both directions can be allowed with a transistor, which would not be possible with a simple diode.

Particularly preferably, the third switching unit and the fourth switching unit of the electric circuit each comprise two transistors arranged in each case such that their blocking directions are opposite. Thus, one of the two transistors of the third switching unit and/or of the fourth switching unit always initially blocks a charging current or a discharging current of the first electrical energy store and/or of the second electrical energy store. Only by switching the transistor operated against its blocking direction, into an electrically connecting state can a charging current or a discharging current flow and the first electrical energy store and/or the second electrical energy store can be charged or discharged. In particular, the transistors of the third switching unit and of the fourth switching unit are connected to one another via their source side or their drain side.

Preferably, the electric circuit at least comprises a fifth switching unit, which is arranged between the third pole connector and the fourth pole connector. In particular, the fifth switching unit is switchable between an electrically disconnecting state and an electrically connecting state and is embodied as a semiconductor component. The fifth switching unit allows an electrical connection between the second pole of the first electrical energy store and the first pole of the second electrical energy store. If the fifth switching unit is in an electrically connecting state, the first electrical energy store and the second energy store are connected in series. Due to the embodiment of the fifth switching unit as a semiconductor component, the electrical connection between the first electrical energy store and the second electrical energy store can be interrupted more quickly than with a high-voltage relay. As a result, the fifth switching unit can also interrupt short-circuit currents during operation of the first electrical energy store and of the second electrical energy store in a series connection. Due to the smaller design of the semiconductor components, more complex circuits, as required here for the switching between a series and a parallel connection of the first electrical energy store to the second electrical energy store, can be implemented with a smaller installation space increase than with high-voltage relays. Such a connection allows both power to the electrical consumer with lower losses than would be the case with a parallel connection of the two electrical energy stores, and to charge the first electrical energy store and the second electrical energy store with charging sources having low charging voltages than the total voltage of the two series-connected electrical energy stores. In particular, the transistors of the fifth switching unit are connected to one another via their source side or their drain side.

Particularly preferably, the fifth electric circuit of the electric circuit comprises two transistors arranged in each case such that their blocking directions are opposite. As a result, both a charging current and a discharging current always flow against the blocking direction of one of the two transistors of the fifth switching unit. Only by switching the transistor, against the blocking direction of which a current wants to flow, into an electrically connecting state can a charging current or a discharging current flow and the first electrical energy store and the second electrical energy store system can be charged or discharged in a series connection.

Preferably, the electric circuit comprises a charging port for connection to a charging unit for charging the first electrical energy store and the second electrical energy store; in addition, the electric circuit comprises a sixth switching unit and a seventh switching unit. The sixth switching unit is arranged between the charging port and the first connection point, and the seventh switching unit is arranged between the charging port and the second connection point. The sixth switching unit and the seventh switching unit are switchable between an electrically disconnecting state and an electrically connecting state. As a result, an external charging unit can be connected to the charging port and an electrical connection can be made to the first connection point and the second connection point via the sixth switching unit and the seventh switching unit. If the first switching unit, the second switching unit, the sixth switching unit and the seventh switching unit are in an electrically connecting state, there is an electrical connection between the charger and the first electrical energy store and the second electrical energy store. If, in addition, the third switching unit and the fourth switching unit are in an electrically connecting state and the fifth switching unit is in an electrically disconnecting state, the first electrical energy store and the second electrical energy store are connected in parallel to the charging unit. If the third switching unit and the fourth switching unit are instead in an electrically disconnecting state and the fifth switching unit is in an electrically connecting state, the first electrical energy store and the second electrical energy store are connected in series to the charging unit. This is particularly advantageous in order to adapt the total voltage of the first electrical energy store and of the second electrical energy store to the charging voltage of different charging units. Thus, due to a parallel connection of the first electrical energy store and of the second electrical energy store to the charging unit, whose charging voltage is not below a voltage of one of the two electrical energy stores can be used to charge the two electrical energy stores. Due to a series connection of the first electrical energy store and of the second electrical energy store, charging units having higher charging voltages can be used to charge the first electrical energy store and the second electrical energy store.

The invention also relates to a high-voltage network of a vehicle comprising a first battery and a second battery as a first electrical energy store and a second electrical energy store. The first battery and the second battery each have two non-identically named poles. Here, the first pole of the first battery is electrically connected to the first pole connector, and the second pole of the first battery is electrically connected to the fourth pole connector, and the first pole of the second battery is electrically connected to the second pole connector, and the second pole of the second battery is electrically connected to the second pole connector.

The invention also relates to a vehicle comprising a high-voltage network, an electric circuit and at least one electrical consumer. In particular, the electrical consumer is an electric vehicle drive having two non-identically named poles. Here, a first pole of the electric vehicle drive is electrically connected to the first connection point, and a second pole of the electric vehicle drive is electrically connected to the second connection point.

BRIEF DESCRIPTION OF THE DRAWINGS

Exemplary embodiments of the invention are described in detail below with reference to the accompanying drawing. The drawing shows.

DETAILED DESCRIPTION

Figure 1:
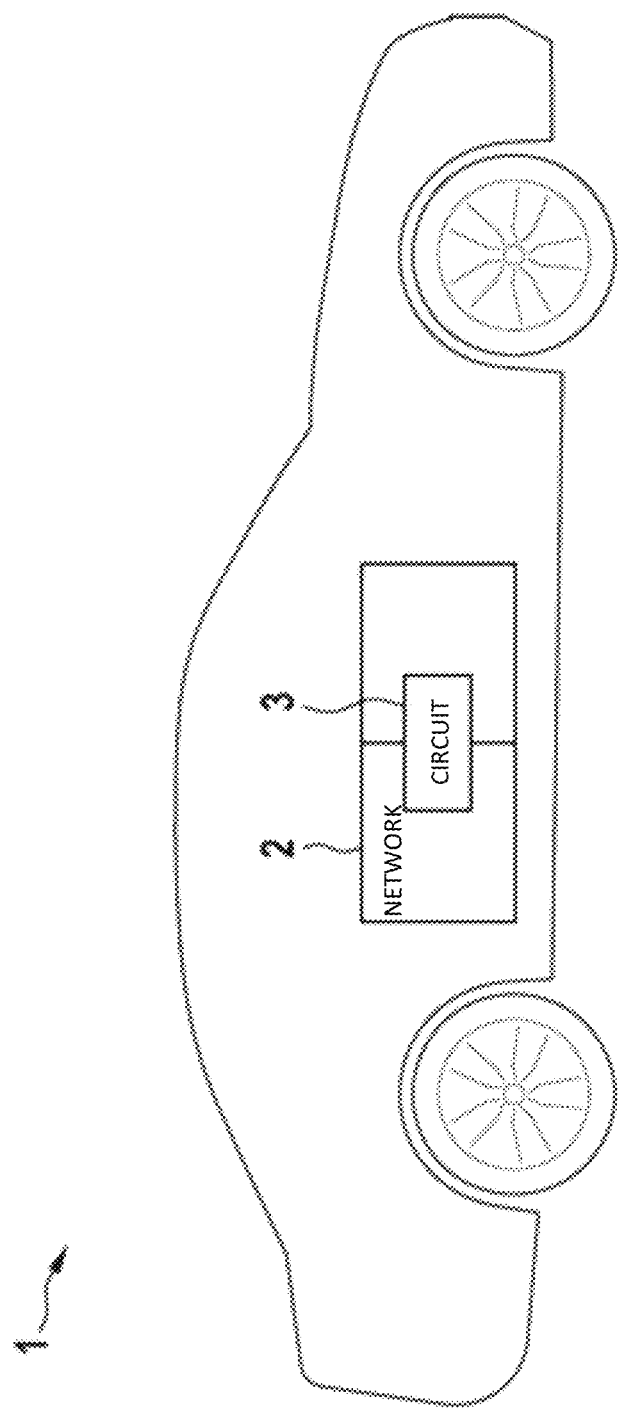
FIG. 1 a schematic figure of a vehicle comprising a high-voltage network and an electric circuit according to an exemplary embodiment of the invention, and FIG. 2 a schematic view of the electric circuit according to an exemplary embodiment with a high-voltage network and a charging unit.

FIG. 1 schematically shows a vehicle 1 comprising a high-voltage network 2 and an electric circuit 3 according to an exemplary embodiment of the invention. Here, the high-voltage network 2 and the electric circuit 3 are electrically connected to one another.

Figure 2:
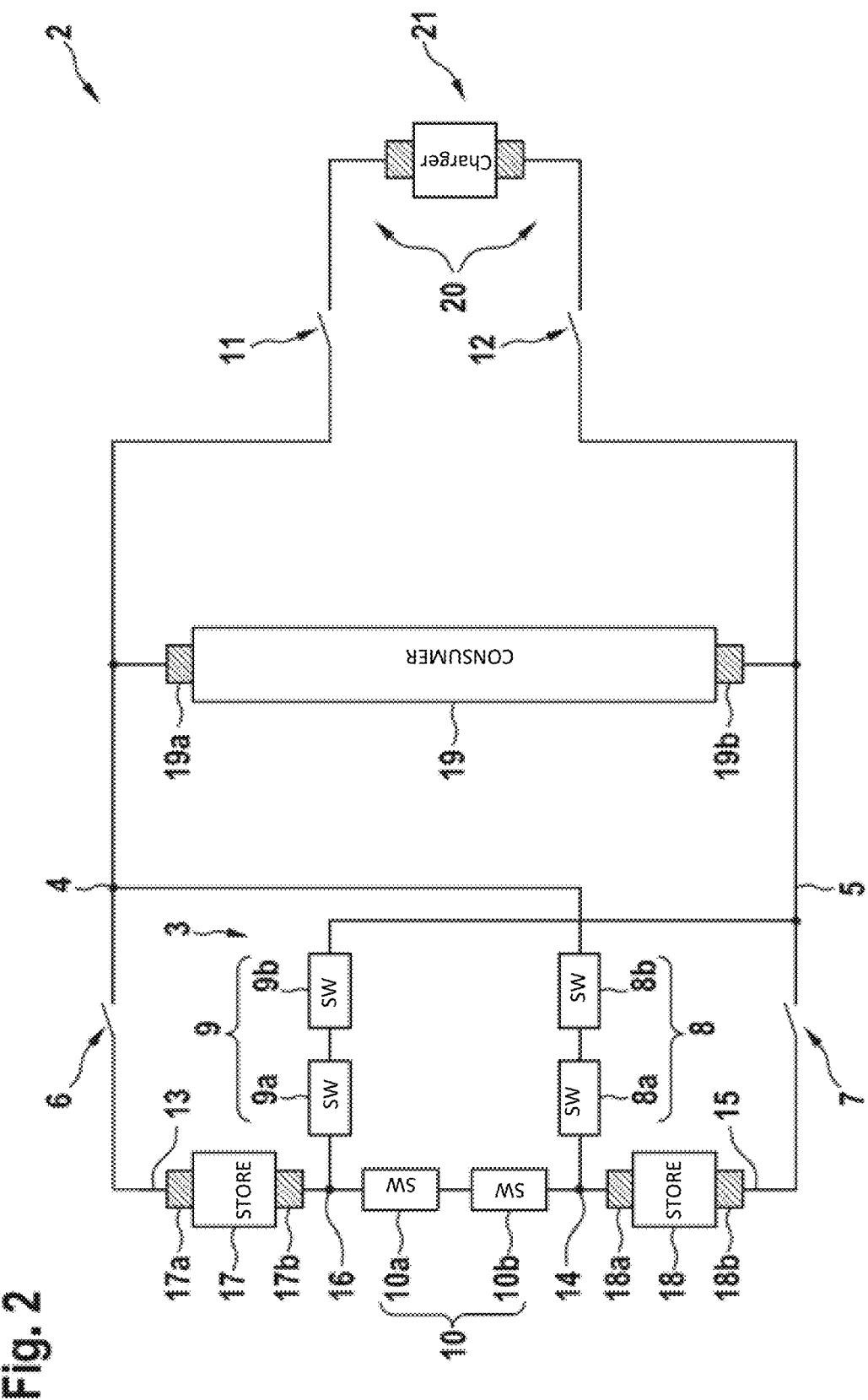

FIG. 2 schematically shows a high-voltage network 2 and the electric circuit 3 according to the exemplary embodiment of the invention, which is electrically connected to the high-voltage network 2. The high-voltage network 2 comprises a first battery 17 with a first pole 17a and a second pole 17b and a second battery 18 with a first pole 18a and a second pole 18b. The poles 17a, 17b, 18a, 18b of the first battery 17 and of the second battery 18 are non-identically named.

A first connection point 4 is configured to make electrical contact with a first pole 19a of an electrical consumer 19 or of an electrical charger 21. A second connection point 5 is configured to make electrical contact with a second pole 19b of an electrical consumer 19 or of an electrical charger 21.

A first switching unit 6 is electrically connected to a first pole connector 13 and the first connection point 4. A first pole connector 13 is electrically connected to the first pole 17a of the first battery 17. A second switching unit 7 is electrically connected to a second pole connector 15 and the second connection point 5. The second pole connector 15 is electrically connected to the second pole 18b of the second battery 18. The first switching unit 6 and the second switching unit 7 are switchable between an electrically disconnecting state and an electrically connecting state. In particular, the first switching unit 6 and the second switching unit 7 are designed to be galvanically isolating in an electrically disconnecting state. This allows a secure disconnection between the first battery 17 and the second battery 18 and further electrical consumers 19 or electrical chargers 21 connected to the first connection point 4 and the second connection point 5.

A third switching unit 8 is electrically connected to a third pole connector 14 and the first connection point 4. The third pole connector 14 is configured to make electrical contact with the first pole 18a of the second battery 18. A fourth switching unit 9 is electrically connected to a fourth pole connector 16 and the second connection point 5. The fourth pole connector 16 is configured to make electrical contact with the second pole 17a of the first battery 17. A fifth switching unit 10 is electrically connected to the third pole connector 14 and the fourth pole connector 16. The third switching unit 8, the fourth switching unit 9 and the fifth switching unit 10 are each designed as two transistors 8a, 8b, 9a, 9b, 10a, 10b which are arranged against their blocking directions and are switchable between an electrically connecting state and an electrically disconnecting state.

Transistors can be designed significantly smaller than high-voltage relays and therefore require less space in the electric circuit. Moreover, transistors do not have any mechanical components that need to be moved for switching from an electrically connecting into an electrically disconnecting state, and therefore show significantly higher switching dynamics than high-voltage relays. This is particularly important when occurring short circuits or overvoltages at the first battery 17 and the second battery 18 are to be avoided in order to prevent damage to the first battery 17 and the second battery 18. For this purpose, the current circuit can be interrupted by switching the transistors 8a, 8b, 9a, 9b, 10a, 10b of the third switching unit 8, the fourth switching unit 9 and the fifth switching unit 10 into an electrically disconnecting state. Since the transistors 8a, 8b, 9a, 9b, 10a, 10b of the third switching unit 8, the fourth switching unit 9 and the fifth switching unit 10 are arranged against their blocking directions, a current in their flow direction is blocked by one each of the two transistors of one of the switching units 8, 9, 10. Thus, the switching units 8, 9, 10 can interrupt both a charging current and a discharging current. Only by actively switching the transistor, against the blocking direction of which a current wants to flow, into an electrically connecting state can a current flow.

If the first switching unit 6 and the second switching unit 7 are in an electrically connecting state, the first battery 4 is connected in parallel to the second battery 5 in that the third switching unit 8 and the fourth switching unit 9 are in an electrically connecting state and the fifth switching unit 10 is in an electrically disconnecting state. By switching the third switching unit 8 and the fourth switching unit 9 into an electrically disconnecting state and the fifth switching unit 10 into an electrically connecting state, the first battery 17 and the second battery 18 can be connected in series.

If the vehicle 1 is in an inactive mode and the first battery 4 and the second battery 5 are neither to be charged nor discharged, the first switching unit 6 and the second switching unit 7 can be switched into an electrically disconnecting state. As a result, any voltage difference between the second pole 17b of the first battery 17 and the second pole 18b of the second battery 18 at the second switching unit 7 and not at the transistors 9a, 9b of the fourth switching unit 9 decreases. Likewise, any voltage difference between the first pole 17a of the first battery 17 and the first pole 18a of the second battery 18 at the first switching unit 6 and not at the transistors 8a, 8b of the third switching unit 8 decreases. Because the transistors 8a, 8b, 9a, 9b of the third switching unit 8 and of the fourth switching unit 9 are not exposed to any voltage difference in an inactive mode of the vehicle 1, the load on the transistors 8a, 8b, 9a, 9b is lowered and their service life is increased.

As shown in FIG. 2, the high-voltage network 2 comprises an electrical consumer 19 comprising two non-identically named poles 19a, 19b. Here, the first pole 19a of the electrical consumer 19 is electrically connected to the first connection point 4 and the second pole 5 of the electrical consumer 19 is electrically connected to the second connection point 5. If the first switching unit 6 and the second switching unit 7 are in an electrically connecting state, the electrical consumer 19 is electrically connected to the first battery 17 and the second battery 18 and can be powered therethrough. In particular, the first battery 17 and the second battery 18 can be connected to one another in series in the supply of the first electrical consumer 19 in order to deliver higher power with lower losses to the electrical consumer 19.

A charger 21 for charging the first battery 17 and the second battery 18 can be connected via a charging port 20. The charging port 20 can be electrically connected to the first connection point 4 via a sixth switching unit 11 and to the second connection point 5 via a seventh switching unit 12. The sixth switching unit 11 and the seventh switching unit 12 are switchable between an electrically disconnecting state and an electrically connecting state. In particular, the sixth switching unit 11 and the seventh switching unit 12 are galvanically isolating in an electrically disconnecting state.

If the first switching unit 4, the second switching unit 5, the sixth switching unit 11 and the seventh switching unit 12 are in an electrically connecting state, there is an electrical connection between the charger 21 and the first battery 17 and the second battery 18. The first battery 17 and the second battery 18 can be charged by the charger 21 both in a series connection and in a parallel connection. The connection of the first battery 17 to the second battery 18 can be adapted to the charging voltage provided by the charger 21. Thus, the total voltage of the first battery 17 and of the second battery 18 is higher in a series connection than in a parallel connection.

The invention claimed is:

1. An electric circuit (3) for a high-voltage network (2) of a vehicle (1), wherein the high-voltage network (2) includes at least two electrical energy stores (17, 18), the electric circuit (3) comprising:
   at least a first connection point (4) and a second connection point (5) configured for electrical connection to a consumer (19) and/or a charger (21),
   at least a first switching unit (6) arranged between a first pole connector (13) configured to make electrical contact with a first pole (17 *a*) of a first electrical energy store (17), and the first connection point (4),
   at least a second switching unit (7) arranged between a second pole connector (15) configured to make electrical contact with a second pole (18 *b*) of a second electrical energy store (18), and the second connection point (5),
   at least a third switching unit (8) arranged between the first connection point (4) and a third pole connector (14) configured to make electrical contact with a first pole (18 *a*) of the second electrical energy store (18), wherein the first connection point (4) is arranged between the first switching unit (6) and the third switching unit (8), and
   at least a fourth switching unit (9) arranged between the second connection point (5) and a fourth pole connector (16) configured to make electrical contact with a second pole (17 *b*) of the first electrical energy store (17),
   wherein the switching units (8, 9) are switchable between an electrically connecting state and an electrically disconnecting state,
   wherein the first switching unit (6) and/or the second switching unit (7) are designed to be galvanically isolating in the electrically disconnecting state, and
   wherein the third switching unit (8) and/or the fourth switching unit (9) include semiconductor components.

2. The electric circuit according to claim 1, wherein the third switching unit (8) and/or the fourth switching unit (9) comprise one or more transistors (8 *a*, 8 *b*, 9 *a*, 9 *b*).

3. The electric circuit according to claim 2, wherein the third switching unit (8) and/or the fourth switching unit (9) each comprise two transistors (8 *a*, 8 *b*, 9 *a*, 9 *b*) respectively arranged such that their blocking directions are opposite, wherein the transistors (8 *a*, 8 *b*, 9 *a*, 9 *b*) of the third switching unit (8) and/or of the fourth switching unit (9) are respectively electrically connected to one another via their source side.

4. The electric circuit according to claim 1, wherein at least a fifth switching unit (10) arranged between the third pole connector (14) and the fourth pole connector (16), wherein the fifth switching unit (10) is embodied as a semiconductor component and is switchable between an electrically connecting state and an electrically disconnecting state.

5. The electric circuit according to claim 4, wherein the fifth switching unit (10) comprises two transistors (10 *a*, 10 *b*) respectively arranged such that their blocking directions are opposite, wherein the transistors (10 *a*, 10 *b*) of the fifth switching unit (10) are electrically connected to one another via their source side.

6. The electric circuit according to claim 1, wherein a charging port (20) for connection to a charging unit (21) for charging the electrical energy stores (17, 18), the electric circuit (3) comprising:
   at least a sixth switching unit (11) arranged between the charging port (20) and the first connection point (4), and at least a seventh switching unit (12) connected between the charging port (20) and the second connection point (5),
   wherein the sixth switching unit (11) and/or the seventh switching unit (12) are switchable between an electrically connecting state and an electrically disconnecting state.

7. A high-voltage network (2) of a vehicle (1) comprising an electric circuit (3) according to claim 1, a first battery (17) with two non-identically named poles (17 *a*, 17 *b*) as a first electrical energy store (17) and a second battery (18) with two non-identically named poles (18 *a*, 18 *b*) as a second electrical energy store (18), wherein the first pole (17 *a*) of the first battery (17) is electrically connected to the first pole connector (13), and the second pole (17 *b*) of the first battery (17) is electrically connected to the fourth pole connector (16), and the first pole (18 *a*) of the second battery (18) is electrically connected to the third pole connector (14), and the second pole (18 *b*) of the second battery (18) is electrically connected to the second pole connector (15).

8. A vehicle (1) comprising an electric circuit (3) that includes at least a first connection point (4) and a second connection point (5) configured for electrical connection to a consumer (19) and/or a charger (21),
   at least a first switching unit (6) arranged between a first pole connector (13) configured to make electrical contact with a first pole (17 *a*) of a first electrical energy store (17), and the first connection point (4),
   at least a second switching unit (7) arranged between a second pole connector (15) configured to make electrical contact with a second pole (18 *b*) of a second electrical energy store (18), and the second connection point (5),
   at least a third switching unit (8) arranged between the first connection point (4) and a third pole connector (14) configured to make electrical contact with a first pole (18 *a*) of the second electrical energy store (18), wherein the first connection point (4) is arranged between the first switching unit (6) and the third switching unit (8), and
   at least a fourth switching unit (9) arranged between the second connection point (5) and a fourth pole connector (16) configured to make electrical contact with a second pole (17 *b*) of the first electrical energy store (17),
   wherein the switching units (8, 9) are switchable between an electrically connecting state and an electrically disconnecting state,
   wherein the first switching unit (6) and/or the second switching unit (7) are designed to be galvanically isolating in the electrically disconnecting state, and
   wherein the third switching unit (8) and/or the fourth switching unit (9) include semiconductor components, and an electric vehicle drive (19) that includes two non-identically named poles (19 *a*, 19 *b*), wherein a first pole (19 *a*) of the electric vehicle drive (19) is electrically connected to the first connection point (4), and a second pole (19 *b*) of the electric vehicle drive is electrically connected to the second connection point (5).

\* \* \* \* \*